United States Patent [19]
Flisch

[11] 3,978,565
[45] Sept. 7, 1976

[54] MULTIPLE-SPINDLE MACHINE TOOL
[75] Inventor: Hermann Flisch, Maienfeld, Switzerland
[73] Assignee: Eunipp AG, Zug, Switzerland
[22] Filed: Sept. 5, 1974
[21] Appl. No.: 503,244

[30] Foreign Application Priority Data
Sept. 14, 1973 Switzerland.................. 13195/73

[52] U.S. Cl. ................................ 29/38 B; 82/3; 408/234
[51] Int. Cl.² .................. B23B 3/32; B23P 23/02
[58] Field of Search .............. 82/3, 2.5; 29/38 A, 29/38 B; 408/234

[56] References Cited
UNITED STATES PATENTS

| | | | |
|---|---|---|---|
| 1,947,800 | 2/1934 | Rupple | 82/3 |
| 2,402,990 | 7/1946 | Drissner | 29/38 B |
| 2,559,025 | 8/1951 | Mialhe | 82/3 |
| 3,180,188 | 4/1965 | Brown | 82/3 |
| 3,726,162 | 4/1973 | Sato | 82/3 |
| 3,744,355 | 7/1973 | Flisch | 82/25 |
| 3,798,720 | 3/1974 | Ledergerber et al. | 29/38 B |
| 3,817,650 | 6/1974 | Reich et al. | 408/234 |

Primary Examiner—Othell M. Simpson
Assistant Examiner—William R. Briggs
Attorney, Agent, or Firm—Michael J. Striker

[57] ABSTRACT

A multiple-spindle machine wherein two upright or horizontal frame members support two spaced-apart coaxial carriers for sets of work spindles. Each spindle of one carrier is aligned with a spindle of the other carrier, and the carriers are indexible in synchronism with each other by a mechanism which also serves to move carriages for turning, grinding, milling and/or other types of tools. The carriages are mounted on several elongated guide members which extend between and are connected to the frame members. Each work spindle can be provided with a chuck or collet, or the spindles in one of the carriers may have chucks or collets whereas the spindles of the other carrier support or constitute centers for elongated workpieces. If the workpieces are short, the machine may include a mechanism which transfers workpieces from the chucks of spindles in one of the carriers into the chucks of spindles in the other carrier whereby the workpieces are inverted end-for-end during transport between the two carriers. The tool carriages have main slides which are movable lengthwise in the ways of respective guide members and cross slides which are mounted on the main slides and are movable transversely of the respective guide members.

22 Claims, 7 Drawing Figures

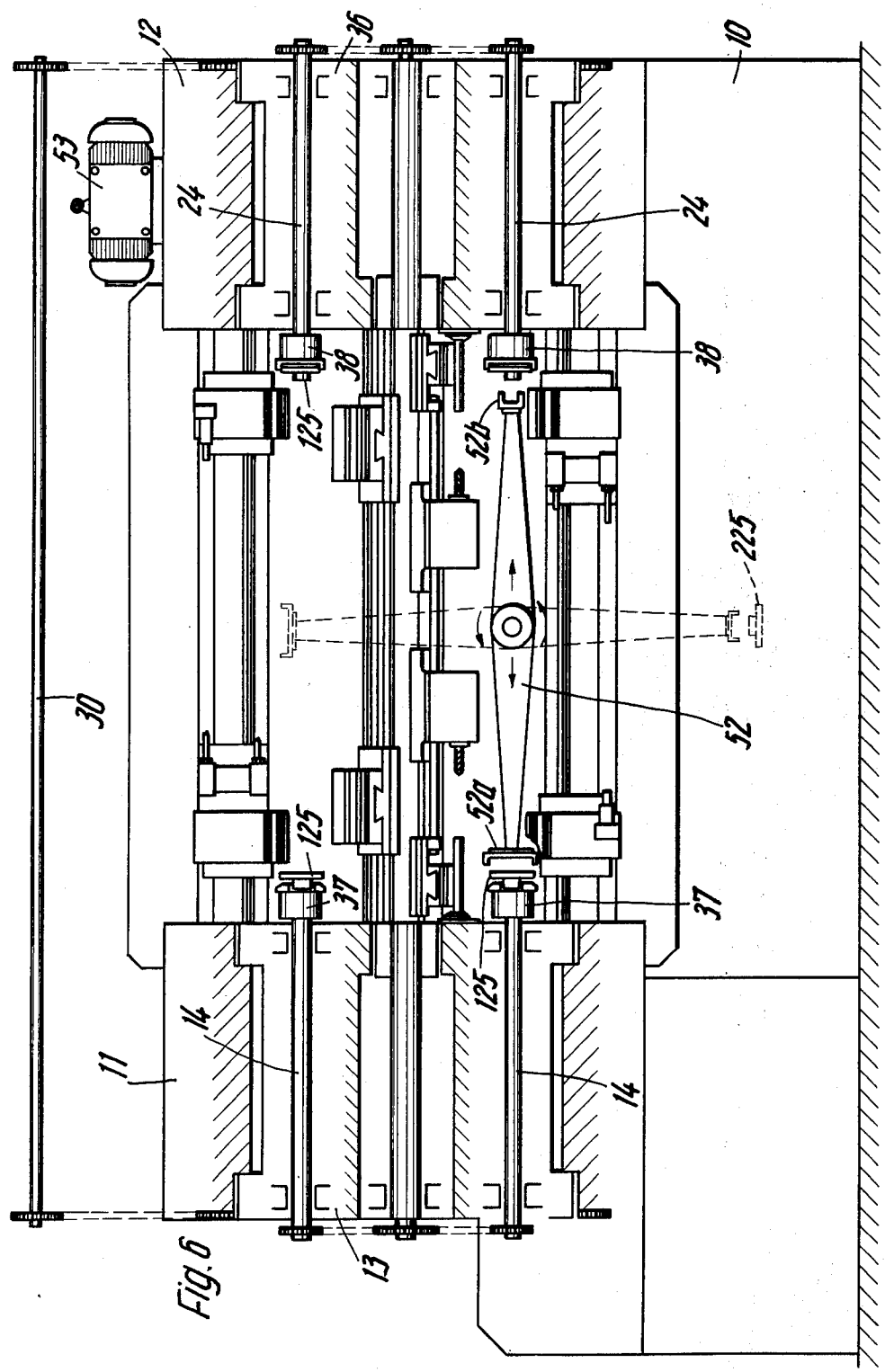

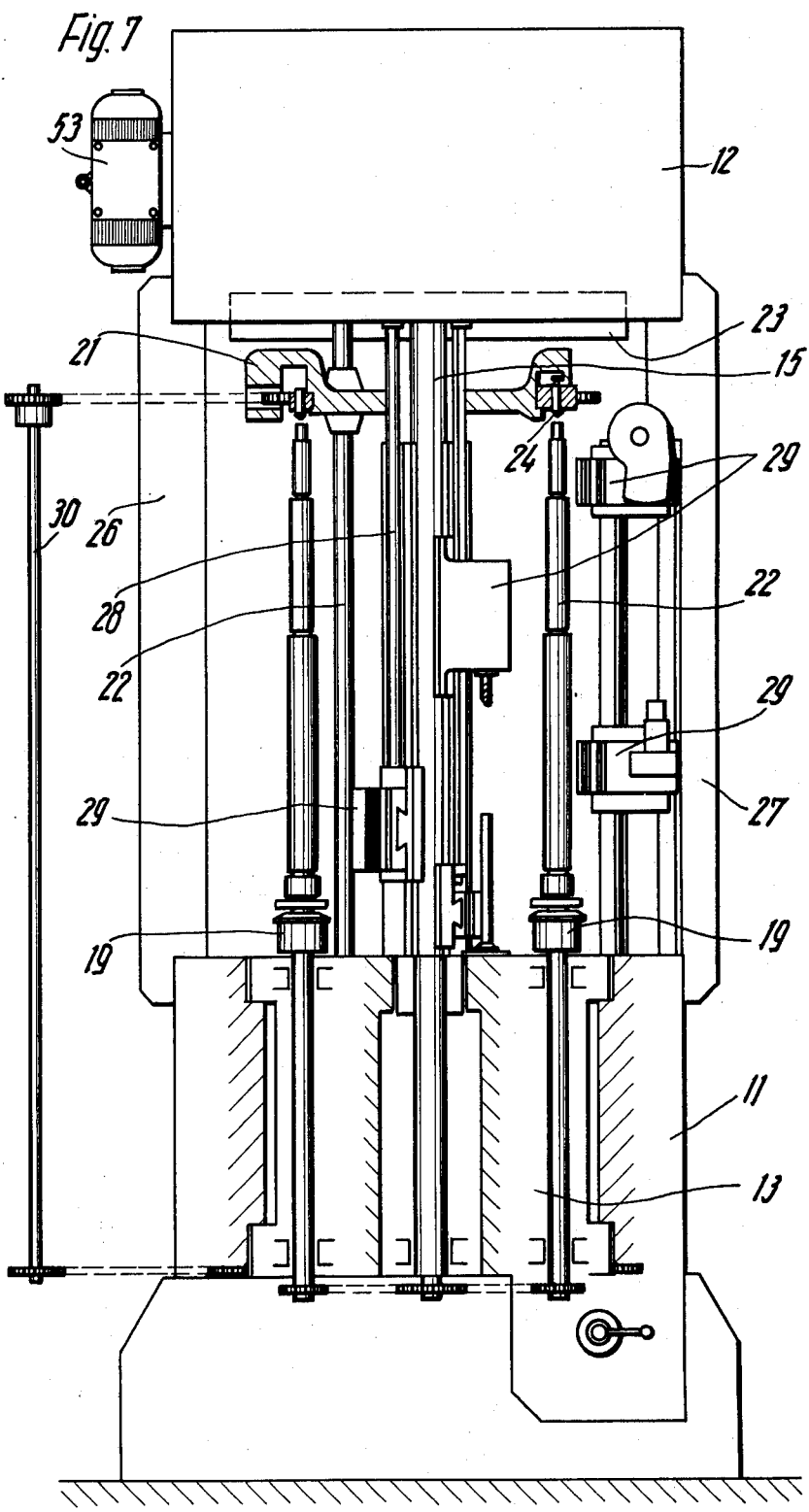

MULTIPLE-SPINDLE MACHINE TOOL

BACKGROUND OF THE INVENTION

The present invention relates to machine tools in general, and more particularly to improvements in multiple-spindle automatic machines of the type wherein a carrier is indexible in the frame of the machine and supports several equally spaced rotary work spindles.

In presently known multiple-spindle automatic chucking or bar machines the frame supports several cross slides for various tools which are used for radial treatment of workpieces. The cross slides are installed in front of the frame member which supports the spindle carrier. The material removing operations lengthwise and at the front ends of the workpieces are carried out by tools which are mounted on a main support extending substantially axially of the spindle carrier. The carriages for tools which are used for lengthwise and front treatment of workpieces are movable along the main support toward or away from the front side of the spindle carrier. It is also known to fixedly mount the tools on the main support and to feed the main support axially of the spindle carrier.

The just described types of multiple-spindle machines are normally used for treatment of large numbers of relatively short workpieces. They are much less suited, or totally unsuited, for the treatment of relatively long workpieces because each workpiece is clamped and held only at one of its ends and the major part of the workpiece remains unsupported. The provision on the main support of a device having means for engaging the free ends of elongated workpieces which extend beyond the chucks or collets of the work spindles would be of little help because such device would interfere with lengthwise movement of the main support and/or with lengthwise movement of tool carriages on the main support. In other words, by mounting the free ends of elongated workpieces on a member which is carried by the main support, one would have to dispense with the longitudinally movable tool carriages so that the workpieces could be treated only by tools which are mounted on the cross slides adjacent to the front face of the spindle carrier.

It is further known to employ in single-spindle machines a pair of work-engaging devices which may constitute chucks, collets or centers. Such machines exhibit a highly desirable versatility; however, their output is only a small fraction of the output of a multiple-spindle machine, even if their operation is fully automatic.

SUMMARY OF THE INVENTION

An object of the invention is to provide a multiple-spindle chucking or bar machine which can be used for treatment of short, medium-sized or long workpieces, wherein the workpieces can be held in and/or between chucks, collets and/or centers, and which renders it possible to subject a variety of workpieces to a simple, medium complex or highly complex treatment which can involve removal of material radially, axially, at one end or at both ends of a workpiece.

Another object of the invention is to enhance the versatility of multiple-spindle automatic chucking or bar machines.

A further object of the invention is to provide novel tool carriages and/or tool holders for use in the improved multiple-spindle machine.

An additional object of the invention is to provide a multiple-spindle machine with novel and improved means for supporting and machining elongated workpieces.

Still another object of the invention is to provide the machine with novel and improved means for indexing the carrier means for work spindles and for moving the tools with respect to the workpieces.

The invention is embodied in a multiple-spindle machine which comprises a frame, spaced-apart first and second spindle carriers indexible about a common axis and rotatably supported by the frame, a plurality of work spindles mounted in each of the carriers in such a way that the axes of all spindles are parallel to the common axis of the carriers and that each spindle in the first carrier is aligned with a spindle in the second carrier, work-engaging devices mounted on the spindles of at least one of the carriers and being located in the space between the carriers, a plurality of elongated guide members rigid with the frame and extending in substantial or exact parallelism with the common axis of the carriers, and tool carriages mounted on and movable with respect to the guide members. At least one of the tool carriages preferably comprises a first or main slide which is movable lengthwise of the respective guide member and a second or cross slide which is mounted on the first slide and is movable substantially transversely of the respective guide member.

The frame preferably comprises two spaced-apart frame members and one of the spindle carriers is mounted directly in one of the frame members. The other spindle carrier may be mounted directly in or indirectly on the other frame member.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 6 is a schematic elevational view of a second machine having a transfer mechanism for short workpieces; and FIG. 7 is a schematic elevational view of an upright multiple-spindle machine.

DESCRIPTION OF THE PREFERRED EMBODIMENTS

Figure 1:
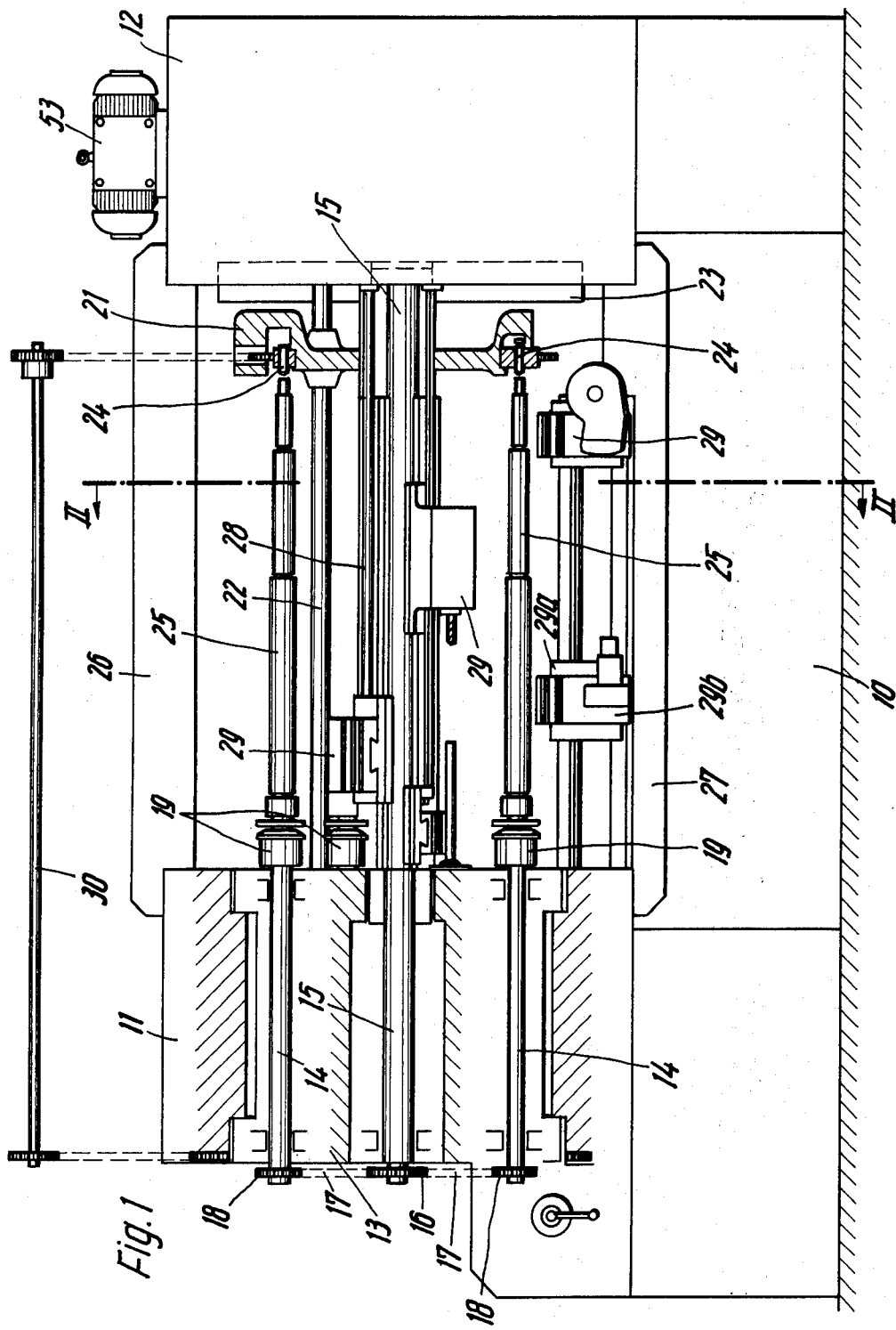
FIG. 1 is a schematic partly elevational and partly vertical sectional view of a horizontal multiple-spindle machine which embodies one form of the invention.
Figures 2, 3:
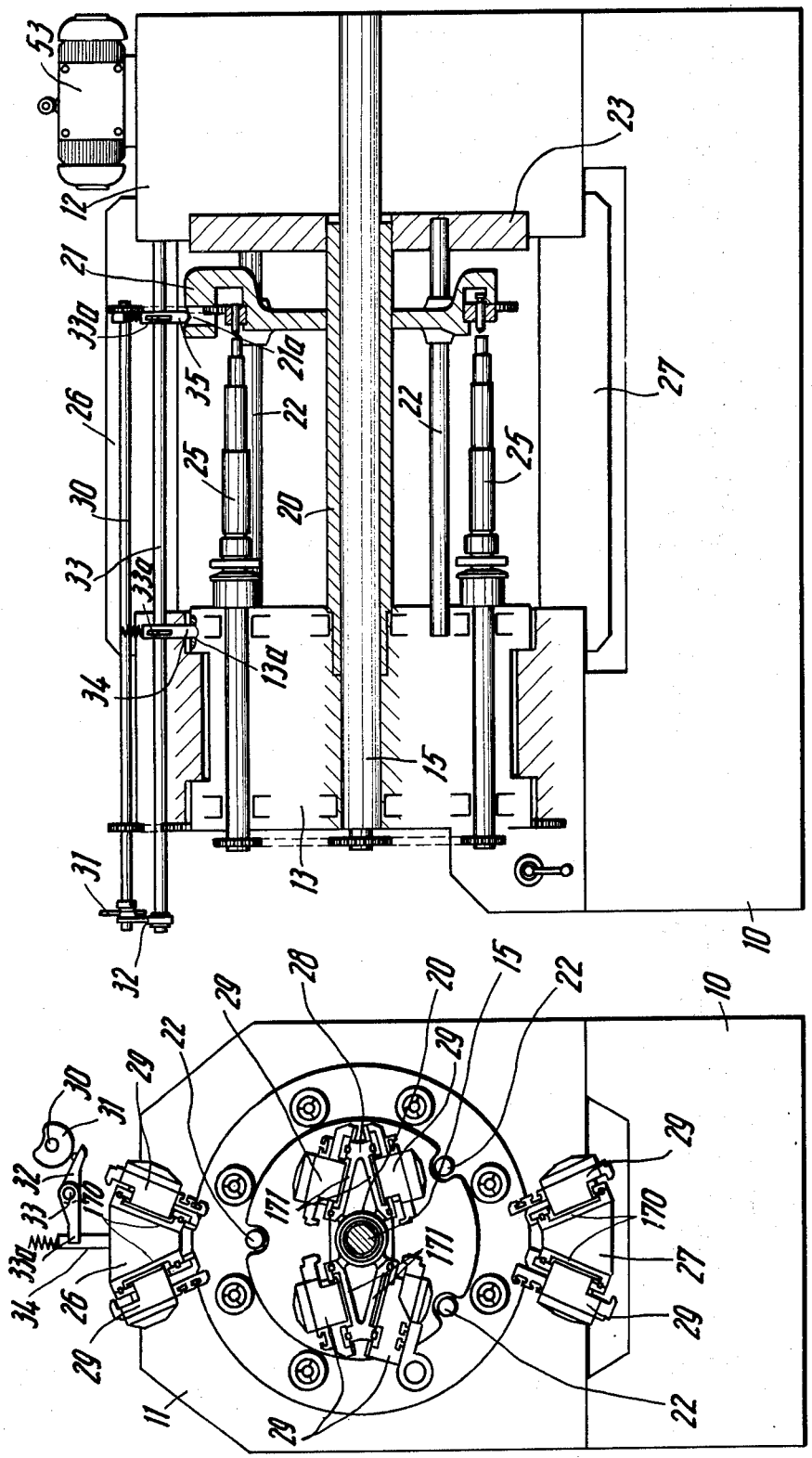
FIG. 2 is a transverse vertical sectional view as seen in the direction of arrows from the line II—II of FIG. 1.
FIG. 3 is a fragmentary partly longitudinal vertical sectional view of the machine of FIG. 1, showing the arresting means for the spindle carriers.

Referring first to FIGS. 1 to 3 there is shown a horizontal multiple-spindle bar or chucking machine having a frame or housing which includes a base or bed 10 and two spaced-apart hollow upright frame members or columns 11, 12. The frame members 11 and 12 are disposed at the opposite ends of a working or treating zone for elongated rod-shaped workpieces 25. In accordance with a feature of the invention, the frame members 11 and 12 are rigidly connected to each other by several horizontal guide members including an uppermost guide member 26, a lowermost guide member 27 and a median or intermediate guide member 28. These guide members stiffen the frame and perform additional functions, especially to support and guide a plurality of tool carriages 29.

The frame member 11 supports and confines the major portion of a horizontal indexible spindle carrier 13 for eight equally spaced parallel horizontal work spindles 14. The carrier 13 can rotate about the axis of a shaft 15 but is held against axial movement toward or away from the frame member 12. The endless path along which the work-clamp or engaging devices 19 at the front ends of the spindles 14 travel in response to indexing of the carrier 13 about the axis of the shaft 15 is free of obstructions so that there is ample room for introduction of workpieces (if the machine is a chucking machine) and/or for removal of treated articles.

The shaft 15 is driven by a main prime mover 53 which is mounted on the frame member 12. That end portion of the shaft 15 which extends rearwardly and beyond the spindle carrier 13 and frame member 11 serves to transmit torque to the work spindles 14. The torque transmitting means is shown only schematically; it includes a composite sprocket wheel or several sprocket wheels 16 on the shaft 15, discrete sprocket wheels 18 on the rear end portions of the work spindles 14, and endless chains 17 which are driven by the sprocket wheel(s) 16 and drive the respective sprocket wheels 18. The shaft 15 extends centrally of the working zone between two mirror symmetrical halves of the guide member 28 (see FIG. 2). The work-engaging devices 19 are chucks if the machine is a chucking machine or collets if the machine is a bar machine.

In accordance with another feature of the invention, the machine comprises a second carrier or turret 21 which is adjacent to the frame member 12 but is movable axially toward and away from the carrier 13. The carrier 21 is mounted on a tubular shaft 20 which surrounds the shaft 15 and the left-hand end portion of which (as seen in FIG. 1) is mounted in the carrier 13. The right-hand end portion of the shaft 20 is mounted in a disk-shaped rotary support 23 on the frame member 12. The means for guiding the carrier 21 during axial movement toward or away from the carrier 13 comprises several horizontal tie rods 22 which are affixed to the carrier 13 and to the support 23. As shown in FIG. 2, the tie rods 22 are inwardly adjacent to the endless path of movement of the work spindles 14 and can bypass the centrally located guide member 26.

The carrier 21 supports eight spindles 24 which have or constitute work-engaging centers and each of which is aligned with one of the spindles 14 in the carrier 13. The centers of the spindles 24 engage the front ends of rod-shaped workpieces 25 which are gripped by the respective devices 19. It is clear that one or more spindles 24 may carry rotary or non-rotatable and stationary or axially movable holders for boring or like rotary tools which can drill smooth-surfaced or tapped bores in the front end portions of the workpieces.

The guide members 26, 27 and 28 are parallel to the axes of the spindles 14, 24 and tie rods 22. The upper and lower guide members 26, 27 are located outside of the endless path of workpieces 25 which are held between the spindles 14 and 24, and the centrally located guide member 28 is located inside such path. The main stiffening action for the frame 10–12 of the machine is supplied by the two outer guide members 26 and 27. FIG. 2 shows that each of the guide members 26, 27 has two elongated tracks or ways 170 for the respective tool carriers 29. The centrally located guide member 28 has four tracks or ways 171 so that it can support at least four tool carriages 29 each of which is movable along a discrete horizontal path. The profiles of tracks 170, 171 of the guide members 26, 27 and 28 are preferably identical so that the tool carriages 29 can be transferred from one track to any other track. Each track of each guide member can support at least one tool carriage 29 and each of these tool carriages may comprise a first or main slide 29a (FIG. 1) which is movable lengthwise of the respective tracks and a second or cross slide 29b which is mounted on the respective first slide 29a and is movable transversely of the corresponding guide member. The tools and their holders are mounted on the cross slides 29b. If the total number of tracks is eight (see FIG. 2), the machine may comprise at least one discrete carriage 29 for each of the eight work spindles 14. However, it is equally within the purview of the invention to increase thee number of guide members and/or tracks so that the machine will support a larger number of tool carriages for movement along separate paths, for example, two carriages for each work spindle 14 or one carriage for a certain number of work spindles 14 and two or more carriages for each remaining work spindle 14. If the number of guide members and/or tracks is such that there are provided at least two tracks for each work spindle 14 or at least two tracks for selected work spindles 14, one of the two tracks is preferably located inwardly and the other of the two tracks is preferably located outwardly of the endless path along which the workpieces 25 move in response to indexing of the carriers 13 and 21.

The construction of the tool carriages 29 (and especially of their tool holders) can be selected practically at will. Thus, the tool holders on certain carriages can accept universal tools and the tool holders on certain other carriages may accept special-purpose tools, such as milling cutters, transverse drilling tools, thread cutters and/or others. Also, the tool holders of certain carriages 29 may support tools for machining of the end faces of workpieces such as counterboring, tapping, drilling and/or other types of operations. This contributes to versatility of the machine and allows for rapid changes in setup.

The means for arresting the carriers 13 and 21 in selected angular positions comprises spring-biased arresting bolts 34, 35 which are mounted on one of the guide members 26–28. As shown in FIG. 3, the arresting bolts 34, 35 are reciprocably mounted in the uppermost guide member 26 and can enter adjacent recesses 13a, 21a in the peripheral surfaces of the respective carriers 13, 21. The means for retracting the arresting bolts 34, 35 prior to indexing of the carriers 13, 21 about the axis of the shaft 15 comprises a main control shaft 30 which performs one complete revolution in response to each indexing movement of the carriers 13, 21 through an angle of 45°. To this end, the main control shaft 30 is rigid with a disk-shaped radial cam 31 (FIGS. 2 and 3) which is tracked by a roller follower on one arm of a lever 32 which is rigid with a second control shaft 33 extending in parallelism with the shaft 30. The control shaft 33 is rigid with two arms 33a which are articulately coupled to the arresting pins 34, 35. The shaft 30 receives motion from a discrete prime mover 39 (FIG. 4) of the indexing mechanism for the carriers 13 and 21. Each revolution of the cam 30 results in pivoting of the arms 33a back and forth whereby the arms 33a lift the respective arresting pins 34, 35 during the interval of indexing of the carriers. During treatment of workpieces 25 by one or more tools, the bolts 34, 35 extennd into the adjoining recesses 13a, 21a to prevent any angular displacements of the carriers.

The prime mover 39 for the indexing mechanism is an electric motor which is mounted on or in the frame member 11 (see FIG. 4) and whose output shaft 40 not only indexes the carriers 13, 21 but also serves as a means for moving the main slides 29a and/or cross slides 29b of selected or all tool carriages 29. The output shaft 40 carries a worm 41 which meshes with a worm wheel (not shown) on an input shaft 42 for a conventional indexing unit 142 (e.g., a geneva movement).

The output shaft 40 extends beyond the worm 41 and drives a horizontal shaft 44 through the medium of two bevel gears 43. The shaft 44 extends axially through the shaft 15 and into the interior of the hollow frame member 12. The right-hand end portion of the shaft 44 drives gear trains 45 which rotate shafts 46 extending in parallelism with the shaft 15. The shafts 46 carry worms 47 in mesh with worm wheels 48 serving to move cams 49 which directly or indirectly move the adjacent cross slides 29b.

Figure 4:
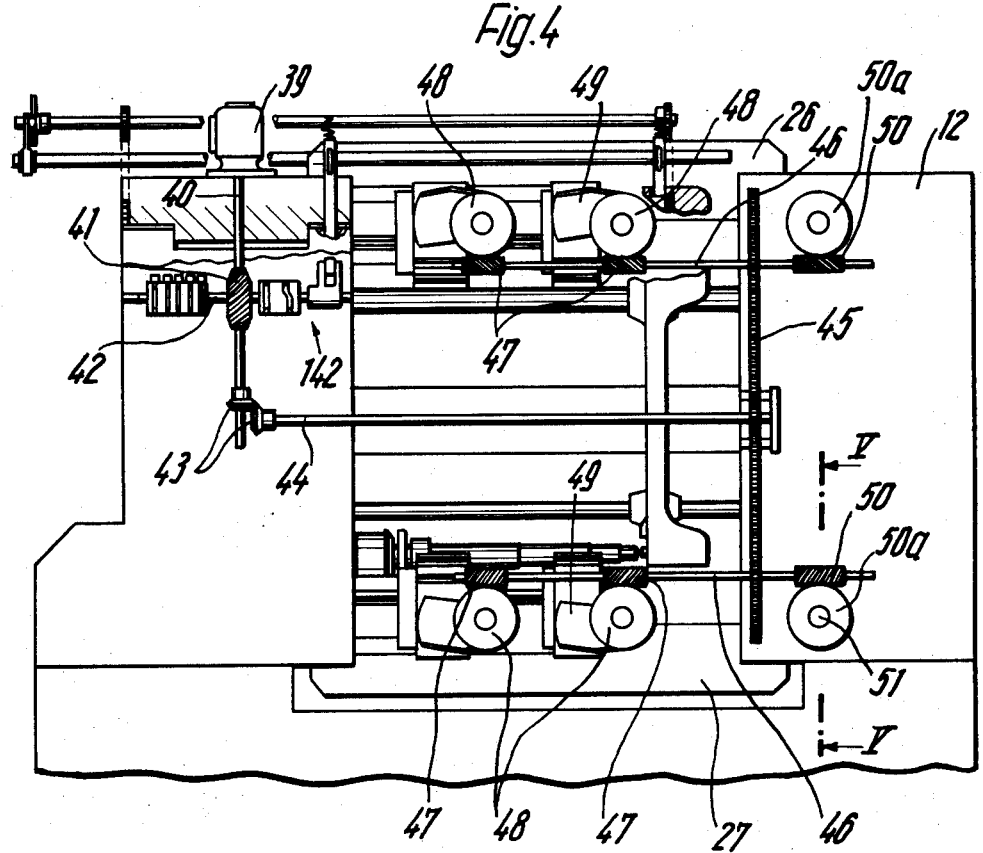
FIG. 4 is a view similar to that of FIG. 3 but showing the indexing means for the spindles.
Figure 5:
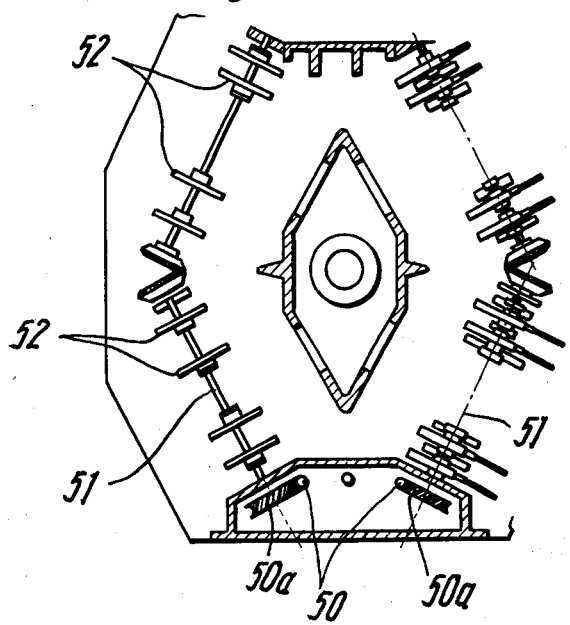
FIG. 5 is a sectional view substantially as seen in the direction of arrows from the line V—V of FIG. 4.

The main slides 29a of the tool carriages 29 also receive motion from the shaft 44. As shown in FIGS. 4 and 5, the shafts 46 carry second worms 50 in mesh with worm wheels 50a on camshafts 51 which support groups of disk-shaped cams 52. The cams 52 can shift the main slides 29a through the medium of push rods or analogous motion transmitting devices, not shown. The just mentioned push rods may extend in parallelism with the guide members 26, 27, 28.

It is clear that the drive means for moving the slides 29a and/or 29b may comprise hydraulic and/or pneumatic motors or a suitable programming system, not shown.

FIG. 6 shows a multiple-spindle machine wherein the second spindle carrier 36 is mounted directly in the frame member 12 in the same way as shown for the mounting of spindle carrier 13 in the frame member 11. The front ends of the work spindles 14, 24 in the carriers 13, 36 respectively carry chucks 37, 38 for workpieces 125. At least one of the stations where the spindles 13, 24 are located during treatment of workpieces 125 is provided with a transfer mechanism 52 here shown as including a two-armed lever having end portions 52a, 52b which can respectively engage a workpiece 125 in the adjacent chuck 37 and remove a finished article 225 from the adjacent chuck 38. The end portion 52a can transport a workpiece 125 from the chuck 37 into the chuck 38 and the end portion 52b can release in article 225 so that the latter descends in a chute, into a receptacle or onto a conveyor, not shown. The illustrated transfer mechanism 52 is associated with work spindles 14, 24 which occupy the six o'clock positions. It is clear that the machine of FIG. 6 may comprise two or more transfer mechanisms and that such transfer mechanisms need not be identical with the mechanism 52.

The purpose of the transfer mechanism 52 is to enable a first tool or a first group of tools to remove material from one end of a workpiece 125 while the other end of the workpiece is being held by the chuck 37, and to thereupon enable one or more tools to remove material from the other end of the workpiece 125 while the one end is being held by the chuck 38. The lever of the transfer mechanism 52 inverts each workpiece 125 end-for-end.

The main prime mover 53 of the machine shown in FIGS. 1–5 or FIG. 6 may be an asynchronous multiphase current electric motor mounted on the frame member 12. However, it is equally possible to employ a prime mover which is an infinitely-variable-speed motor. It is further clear that the improved machine can be provided with means for driving the work spindles 14 and/or 24 at different speeds, for example, to rapidly rotate the spindles 14 which reach the three, six or nine o'clock position and to rotate the spindles in other positions at a reduced speed. Moreover, and depending on the nature of treatment of workpieces at a particular station, the machine may comprise means for arresting at least one work spindle in a predetermined angular position when such spindle reaches a selected treating station. The mechanical drive means for the work spindles can be replaced with discrete hydraulic motors which are especially suited to drive the respective spindles at two or more different speeds so that a spindle occupying, for example, the six o'clock position will rotate faster than a spindle in the nine o'clock position. Also, such discrete motors are especially suited to arrest the spindles in predetermined angular positions during the periods of dwell at one or more treating stations.

The machine of FIG. 7 is practically identical with the machine of FIGS. 1–5, except that the spindle carriers 13, 21 are indexible about a common vertical axis. The frame members 11, 12 are horizontal and the guide members 26–28 are vertical.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

I claim:

1. In a multiple spindle machine, a combination comprising, a frame having two spaced apart frame members; spaced apart first and second spindle carriers indexible about a common axis and rotatably supported by said frame; a plurality of work spindles mounted in each of said carriers, the axes of said work spindles being parallel to said common axis and each spindle in said first carrier being aligned with a spindle in said second carrier; work engaging devices mounted on the spindles of at least one of said carriers and located in the space between said carriers; means for indexing said spindle carriers in synchronism about said common axis whereby said spindles travel along an endless path; a plurality of elongated guide members extending in parallelism with said common axis between said spaced apart frame members fixed thereto, said guide members including at least one guide member located at the outer side of said path and at least one guide member located at the inner side of said path; tool carriages mounted on and movable with respect to said inner and outer guide members, each of said carriages including a first slide movable lengthwise of the respective guide member and a second slide mounted on and movable relative to said first slide substantially transversely of the respective guide member, and means to so move said carriages.

2. A combination as defined in claim 1, wherein the work-engaging devices on the spindles in said one carrier include centers.

3. A combination as defined in claim 1, wherein the work-engaging devices on the spindles in said one carrier are chucks.

4. A combination as defined in claim 1, wherein one of said spindle carriers is rotatably mounted in one of said frame members and the other of said spindle carriers is disposed between said frame members.

5. A combination as defined in claim 1, wherein said first and second spindle carriers are respectively mounted in said first and second frame members.

6. A combination as defined in claim 1, wherein each of said guide members has at least two elongated tracks and said tool carriages include at least two carriages on each of said guide members, each of said two carriages being movable along a discrete track of the respective guide member.

7. A combination as defined in claim 6, wherein said tracks have identical profiles so that said tool carriages are transferrable from a first track to a second track having the same profile as said first track.

8. A combination as defined in claim 1, further comprising means for rotating the spindles in at least one of said carriers including a first shaft rotatably mounted in said frame and coaxial with said carriers, and a tubular second shaft surrounding said first shaft and having an end portion secured to said first carrier, said second carrier being mounted on and being movable axially of said second shaft.

9. A combination as defined in claim 8, wherein said first carriage is rotatably mounted in one of said frame members and said second shaft has a second end portion mounted in the other of said frame members.

10. A combination as defined in claim 9, further comprising tie rods for said second carrier, said tie rods having first end portions mounted in said one carrier and second end portions adjacent to said second frame member, and a support connected with said second end portions of said tie rods and rotatably mounted in said second frame member, said other carrier being movable lengthwiise of said tie rods.

11. A combination as defined in claim 1, further comprising means for rotating said work spindles in at least one of said carriers, said rotating means and said indexing means respectively comprising discrete first and second prime movers.

12. A combination as defined in claim 1, further comprising means for moving said carriages with respect to the corresponding guide members, said indexing means and said means for moving said carriages having a common prime mover.

13. A combination as defined in claim 1, further comprising means for moving said carriages relative to the respective guide members, including gear trains, worm drives receiving motion from said gear trains, and cam and follower means receiving motion from said worm drives and arranged to move said carriages.

14. A combination as defined in claim 1, further comprising fluid-operated motor means for rotating the work spindles in at least one of said carriers.

15. A combination as defined in claim 1, further comprising fluid-operated means for moving said carriages with respect to the corresponding guide members.

16. A combination as defined in claim 1, further comprising programming means for moving said carriages relative to the respective guide members.

17. A combination as defined in claim 1, further comprising tool holders mounted on the spindles of the other of said carriers and located in the space between said carriers.

18. A combination as defined in claim 17, wherein said tool holders are holders for rotary tools.

19. A combination as defined in claim 17, further comprising means for feeding said tool holders in parallelism with the common axis of said carriers.

20. In a multiple spindle machine, a combination comprising a frame having two spaced apart frame members; spaced apart first and second spindle carriers indexible about a common axis and rotatably supported by said frame; a plurality of work spindles mounted in each of said carriers, the axes of said work spindles being parallel to said common axis and each spindle in said first carrier being aligned with a spindle in said second carrier; work engaging devices mounted on the spindles of at least one of said carriers and located in the space between said carriers; means for indexing said spindle carriers in synchronism about said common axis, whereby said spindles travel along an endles path; a plurality of elongated guide members extending in parallelism with said common axis between said spaced apart frame members fixed thereto, said guide members including at least one guide member located at the outer side of said path and at least one guide member located at the inner side of said path; tool carriages mounted on and movable with respect to said guide members; means for rotating said work spindles in at least one of said carriers, said rotating means and said indexing means respectively comprising discrete first and second prime movers; and means for moving said carriages in response to operation of said second prime mover.

21. A combination as defined in claim 20, wherein said means for moving said carriages comprises gear trains and worm drives receiving motion from said second prime mover.

22. In a multiple spindle machine, a combination comprising a frame having two spaced apart frame members; spaced apart first and second spindle carriers indexible about a common axis and rotatably supported by said frame; a plurality of work spindles mounted in each of said carriers, the axes of said work spindles being parallel to said common axis and each spindle in said first carrier being aligned with a spindle in said second carrier; work engaging devices mounted on the spindles of at least one of said carriers and located in the space between said carriers; means for indexing said spindle carriers in synchronism about said common axis, whereby said spindles travel along an endless path; a plurality of elongated guide members extending in parallelism with said common axis between said spaced apart frame members fixed thereto, said guide members including at leasat one guide member located at the outer side of said path and at least one guide member located at the inner side of said path; tool carriages mounted on and movable with respect to said guide members; and a tiltable arm for transferring workpieces from the work engaging device on at least one spindle in one of said carriers to the work engaging device of a spindle in the other of said carriers.

* * * * *